United States Patent [19]

Barrella

[11] 4,184,012

[45] Jan. 15, 1980

[54] CELL REACTION BARRIER

[75] Inventor: Joseph N. Barrella, Irvington, N.Y.

[73] Assignee: P. R. Mallory & Co. Inc., Indianapolis, Ind.

[21] Appl. No.: 912,611

[22] Filed: Jun. 5, 1978

[51] Int. Cl.² .............................................. H01M 6/00
[52] U.S. Cl. ..................................... 429/94; 429/178; 429/218; 429/249
[58] Field of Search ...................... 429/94, 48, 49, 122, 429/129, 143, 178, 211, 218, 101, 133, 169, 163, 194, 254

[56] References Cited

U.S. PATENT DOCUMENTS

| | | | |
|---|---|---|---|
| 2,597,455 | 5/1952 | Coleman et al. | 429/194 |
| 3,804,671 | 4/1974 | Rosansky | 429/194 |
| 4,074,023 | 2/1978 | Urry | 429/56 |

*Primary Examiner*—Anthony Skapars
*Attorney, Agent, or Firm*—Ronald S. Cornell; Israel Nissenbaum; Martin M. Glazer

[57] ABSTRACT

Fragmentation with electrical discontinuity in a consumable electrode of an electrochemical cell is minimized by preventing a portion of said electrode from reacting by means of a reaction barrier.

25 Claims, 3 Drawing Figures

CELL REACTION BARRIER

This invention relates to electrochemical cells having consumable electrodes and particularly to those cells wherein such electrodes do not have conducting substrates and most particularly to cells wherein the consumable electrode is lithium.

During the discharge of an electrochemical cell having a consumable electrode such electrodes have a tendency to be consumed in random fashion with resulting fragmentation of the electrode material into isolated sections. Such sections are then electrically disengaged from the electrode terminal connection and cannot function further as active dischargeable materials. In order to minimize this problem and prevent premature cell life termination, conductive substrates such as expanded metals, wire cloths, conductive carbon sheets and the like have been used with consumable electrode materials in order to improve utilization of the consumable material by maintaining electrical continuity between fragmented sections. However, conductive substrates have the disadvantage of reducing the volume of the active material in an electrode because of their own volume. Furthermore, conductive substrates involve costly manufacturing steps in their positioning. Expanded metal substrates, which are most commonly used, have the additional disadvantage that when a portion thereof becomes exposed during discharge there is the likelihood that the sharp edges therein will puncture the cell separator thereby leading to internal cell shorting. In cells not having conductive substrates, considerable excess consumable electrode material must remain at the end of cell discharge in order to minimize electrode fragmentation with electrical discontinuity. The need for the excess material prevents full utilization of the electrode and therefore reduces the efficiency of the cell. Additionally, when the remaining electrode material is a highly active material such as lithium, the large amounts of excess material remaining in the cell at the end of discharge may pose safety problems.

It is an object of the present invention to minimize fragmentation of consumable electrode materials.

It is a further object of the present invention to provide a means whereby utilization efficiency and utilizable capacity of consumable electrodes is increased.

It is a still further object of the present invention to provide a means whereby the safety of a cell containing highly active consumable electrode materials may be enhanced.

These and other objects, features and advantages of the present invention will become more apparent from the the following discussion as well as the drawings in which.

Figure 1:
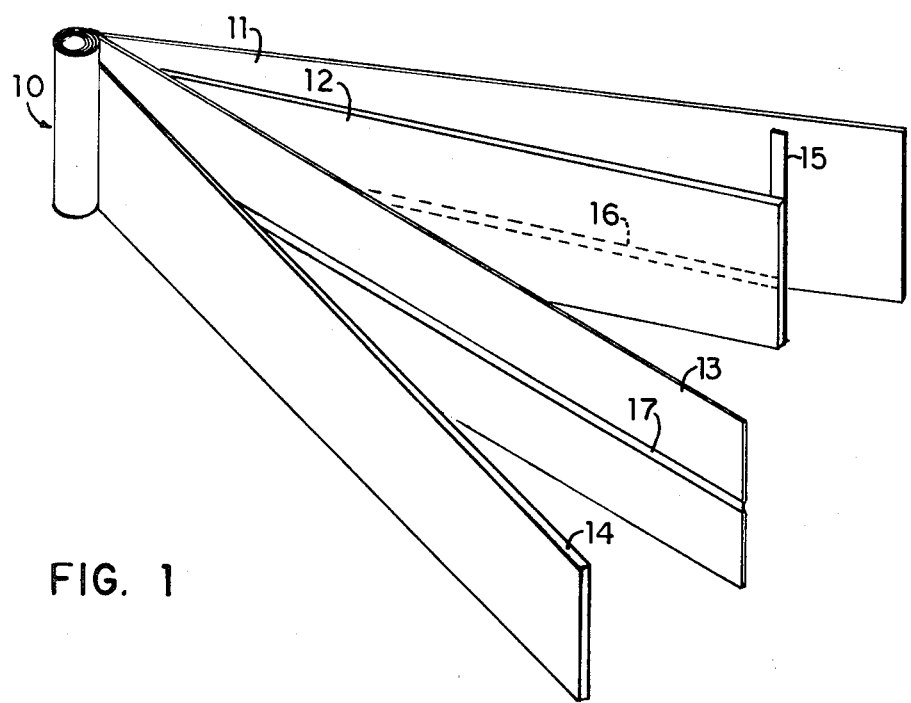
FIG. 1 is an expanded isometric view of an electrode/separator assembly embodying the present invention during winding into a rolled structure.

Generally the present invention comprises the retardation or prevention of reaction of a portion of a consumable electrode during discharge of an electrochemical cell containing such electrode.

It is accepted practice to maximize the interaction between electrodes and cell reaction in an electrochemical cell and to avoid the formation of unreacted portions of an electrode in order to achieve high discharge rates and utilization of the electrode materials. However, it has been discovered that when a portion of a consumable electrode is prevented from reacting prior to the reaction of the remainder of the electrode, the actual discharge capacity of a cell may be increased even though the theoretical capacity may be reduced. The increase in actual discharge capacity occurs when the unreacted portion remains electrically connected to the electrode terminal during cell discharge. Preferably such portion also extends along substantially the entire length of the electrode. The unreacted portion minimizes electrode fragmentation by providing requisite electrical continuity within the consumable electrode to the electrode terminal without the need for conductive substrates. It has been found that losses in capacity engendered by the unreacted portions are more than compensated by the thus achievable capacity of the normally fragmented sections. Thus, the actual capacity of a cell is improved by fuller utilization of existing electrode materials with minimized fragmentation and by the elimination of the volume taken up by substrates.

In order to retard or prevent reaction of a portion of the consumable electrode an ionic flow impeding barrier is positioned between such portion and an adjacent section of the current collector of the electrode of opposite polarity. By restricting ionic flow between the electrodes adjacent a portion of the consumable electrode, other sites on the consumable electrode are preferentially reacted. Thus, at the end of discharge it is the ionically restricted portion which remains unreacted. Since the unreacted portion should maintain electrical contact with the electrode terminal, the barrier is placed in a position such that the unreacted portion remains with such electrical contact.

Alternatively, a portion of the consumable electrode may be prevented or retarded from reacting when an adjacent portion of the electrode of opposite polarity is prevented or retarded from taking part in the cell reaction itself since electrodes generally react with one another at adjacent positions. Prevention or retardation of reaction of a portion of the electrode of opposite polarity may be accomplished by shielding such portion from directly electrically contacting its own current collector such as by insulating the current collector contiguous thereto. Though there may be circuitous electrical connection through adjacent portions of the electrode, reaction may be still sufficiently retarded at the insulated portion because of the lack of direct connection.

In the instance when the electrode of opposite polarity is in itself not an active material but rather functions as a reaction site such as a carbon cathode depolarized by an active fluid depolarizer material, a section thereof may be made unsuitable as a reaction site, with reduction of reaction thereby, such as by reduction of reaction sites or reduction of ionic flow or electronic conductivity therein. Densification of a section of the electrode, for example, serves to reduce reaction sites and ionic flow therethrough. Alternatively, ionically and/or electronically conducting materials may be excluded from such section or non-ionically and/or non-electronically conductive materials may be included therein for reduction of ionic and electronic conductivity.

When the electrode of opposite polarity is an active material, reduction of ionic flow or conductivity and/or electronic conductivity in a portion thereof, is expected to result in similar prevention or retardation of reaction.

To maintain an unreacted portion of a consumable electrode within a cell it is generally sufficient to provide a cell reaction barrier between the current collector of opposite polarity and the desired unreacted portion of the consumable electrode. The reaction barrier may be integral within the electrodes themselves or the separator therebetween or may constitute an additional member with such member having properties of ionic flow or conductivity retardation and/or electronic conductivity retardation depending upon its positioning. Between the electrode of opposite polarity and its current collector, the barrier should be electrically insulative. Within the electrode of opposite polarity it may be ionically less permeable or conductive or electrically insulative or have less reaction sites. Between the unreacted portion and the electrode of opposite polarity, it should retard ionic flow.

The presently preferred reaction barrier comprises a section of the ionically permeable cell separator which has been treated such as by a heated roller or bar, by ultrasonic waves, pressure and the like to become less ionically permeable.

The unreacted portion of the consumable electrode may be of any shape or configuration including totally separated elements. However, each of the elements of the unreacted portion should be in electrical contact with the electrode terminal.

The dimensions of the unreacted portion should be minimal so that the consumable electrode is reacted to a maximum extent. However, the unreacted portion should be of a size such that electrical resistance therein does not restrict the electrical conduction and that the portion has sufficient structural integrity to maintain a continuous electrical path to the electrode terminal. Preferably the unreacted portion is less than twenty percent of the original active consumable electrode material.

Fragmentation of consumable electrodes is more pronounced in elongated electrodes because of the increasing distance between the electrode terminal and segments of the electrode. Accordingly, the positioning of the unreacted portion, is in single or multiple thin strip form, and preferably symmetrically centrally along the longitudinal axis of a rectangular electrode in order to maintain minimal distance between the unreacted portion, connected to the electrode terminal, and the rest of the electrode. In electrodes having other shapes, positioning of the unreacted portion is preferably that of providing minimal distance between the unreacted portion and the rest of the electrode.

In some instances such as plate type consumable electrodes a grid configuration of the unreacted portion may be useful in maintaining electrical continuity. However, it should be understood that increasing the total area of the unreacted portion reduces the cell capacity. Accordingly, the factors of reduced fragmentation and continued electrical continuity must be balanced against decreased capacity engendered by the unreacted portions of the consumable electrode in arriving at optimal dimensions and configuration of the unreacted portion.

Patterns with reduced area in the configuration of the unreacted portion may have value in increasing the capacity of the consumable electrode. However, such increased capacity must be balanced against the possibility that such patterns might be more susceptible to electrical discontinuity because of such reduced area.

The unreacted portion's shape, configuration, dimensions, positioning and the like are roughly determined by those of the cell reaction barrier. The cell reaction barrier criteria are thus correspondingly predetermined in order to obtain the desired unreacted portion.

In the drawings, the partially rolled electrode/separator 10 in FIG. 1 is commonly used in high energy density cells having anode materials such as lithium. Separator elements 11 and 13 are ionically permeable microporous polypropylene. Lithium anode 12 is a consumable electrode and is physically separated in the completed cell from carbonaceous cathode 14 by separators 11 and 13. Carbonaceous cathode 14 serves as a reaction site for the cathode depolarizer during cell discharge. By heat treating a strip region 17, such as by a heated roller or bar, the microporous polypropylene becomes dense and less ionically permeable, as evidenced by such region becoming transparent. Region 17 thus functions as the cell reaction barrier with portion 16, indicated by the dotted lines, of anode 12 (correspondingly positioned adjacent region 17) being substantially prevented from reacting. In a similar manner separator 11 may be (by itself or in addition to separator 13 with barrier 17) constructed with a cell reaction barrier since it also separates anode 12 and cathode 14 in the rolled electrode/separator structure.

Figure 2:
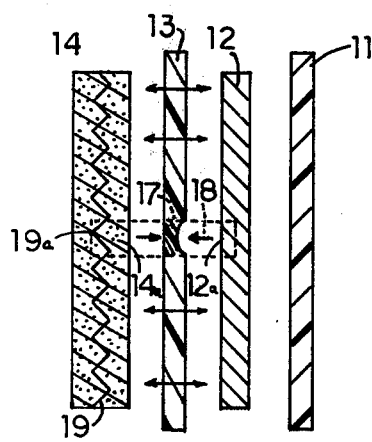
FIG. 2 is a schematic vertical cross section of an electrode/separator tier of the electrode/separator assembly prior to discharge with components separated for clarity.
Figure 3:
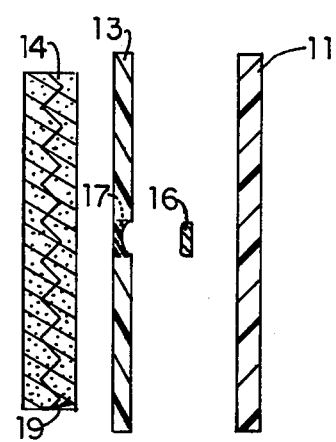
FIG. 3 is the schematic cross section of the tier of FIG. 2 shown at the end of cell discharge.

As more clearly seen in FIG. 2, ionic barrier 17 is situated within region 18 in order to produce the desired unreacted portion 16 shown in FIG. 3 at the end of cell discharge. The arrows in FIG. 2 indicate ionic flow and the blocking or restriction of such flow by barrier 17. At the end of discharge a thin strip 16 as in FIGS. 1 and 3 remains of the lithium metal with such strip remaining in electrical contact with terminal tab 15 of FIG. 1. Because of the rolled electrode/separator structure, tab 15 also reduces reaction of lithium anode 12 in an area contiguous thereto with some lithium remaining there as well. The reduced reaction is that of lithium anode 12 and a part of cathode 14 (not shown) separated therefrom by separator 11.

Unreacted portion 16 may be positioned anywhere in anode 12 which is opposite cathode 14 with barrier region 18 positioned accordingly. The vertical height and length of barrier region 18 is roughly determined by the desired dimensions of unreacted portion 16. The horizontal area of barrier region 18 extends from the current collector 19 of cathode 14 to the interior of anode 12. In the rolled electrode/separator configuration shown, unreacted portion 16 is about half of the thickness of anode 12 which also reacts with cathode 14 through separator 11. Accordingly, barrier regon 18 extends to about the halfway point of the anode thickness whereby a portion remains unreacted.

In FIG. 2, possible reaction barriers within region 18 include electrical insulation of segment 19a of cathode current collector 19. Cathode section 14a may thereby be substantially retarded from reacting with anode portion 16 with resulting retardation of reaction of portion 11. Cathode section 14a may itself be treated such as by densification such that reaction sites are minimized and/or ionic flow therethrough is retarded and section 14a becomes the cell reaction barrier. Even a compatible ionically less permeable painted line on surface 12a of anode 12 may be useful in preventing portion 16 from reacting. It is of course understood that many variations in positioning and materials of the reaction barrier are possible with the above examples enumerated for illustrative purposes only.

It is presently preferred to utilize a portion of the separator such as microporous polypropylene or other polyolefins and plastics or cellulosic materials as the cell reaction barrier because of the ease with which ionic permeability may be lessened. However, other cell separators such as porous glass (commonly used in cells having thionyl chloride cathode depolarizers because of compatibility considerations) become brittle and difficult to wind into the above described rolled structure, when a portion thereof is densified to reduce ionic permeability. Thus additional elements may be used as cell reaction barriers. When used to isolate a segment of an electrode (of a polarity opposite that of the consumable electrode) from its current collector in an area contiguous to the desired unreacted portion such additional elements may comprise an electrically insulative material such as a plastic compatible with the cell components. When the additional elements operate by reducing ionic flow, densified plastics which are compatible with the cell components may be utilized. Examples of such plastics include polyolefins such as polyethylene and polypropylene, fluorcarbons, nylon and the like. Densified glass (aside from a portion of a separator) may be used as the reaction barrier in cells having plate electrodes or non-rolled structures. Even electrically conductive materials such as metals (provided they do not internally short out the cell and they are compatible with cell components) may be used as ionic flow reducing cell reaction barriers. Examples of metals, commonly found in cells, which can function as the cell reaction barrier include stainless steel, copper, nickel, titanium, aluminum, and the like. In short, any ionic flow reducing material may be utilized as a cell reaction barrier provided cell compatibility considerations are observed.

As an example of the advantages of the present invention, a balanced $Li/SO_2$ cell should have a minimum of lithium remaining after discharge. The present invention obviates the need for excess amounts of consumable electrode material. Surprisingly, therefore, use of the present invention permits (where lithium is deliberately left unreacted) the lithium to be utilized as the limiting electrode with a minimal amount of lithium remaining at the end of cell discharge.

Generally, all anodes are considered consumable and include the alkali and alkaline earth metals, aluminum and zinc.

Cathodes are generally not considered consumable and comprise the electrodes of opposite polarity. Included in such cathodes are carbonaceous substrates for fluid depolarizer materials such as $SO_2$ and $SOCl_2$. Also included are active cathodes including metal oxides, metal halides, metal chalcogenides, metal vanadates, metal chromates and the like. Generally, the aforementioned cathodes comprise pressed or otherwise adhered powder on conductive substrates.

In order that the present invention be more completely understood, the following examples are given. These examples are set forth primarily for the purpose of illustration and as a comparison of the efficacy of the present invention as compared to that of the prior art. Any specific enumeration of detail contained therein should not be construed as a limitation on the present invention.

EXAMPLE I

A "D" size cell is constructed with a rolled configuration and having a lithium foil anode with the dimensions of $0.008 \times 1.625 \times 21$ inches ($0.02 \times 4.13 \times 53.34$ cm) having a nickel terminal tab attached to its outer end, a carbonaceous cathode on an aluminum expanded metal substrate with the dimensions of $0.033 \times 1.625 \times 23.5$ inches ($0.084 \times 4.13 \times 56.69$ cm), an inner and an outer microporous polypropylene separator sandwiched between the anode and cathode each having the dimensions of $0.001 \times 1.875 \times 24$ inches ($0.003 \times 4.76 \times 60.96$ cm), and sulfur dioxide as the cathode depolarizer. The inner microporous separator, prior to its use in the cell, has been heat treated centrally along its longitudinal axis with the edge of a heated roller having a width of 0.125 inch (0.32 cm). When discharged at a constant rate of 400 milliamperes the cell achieves about 90% of theoretical capacity to a two-volt cutoff with a strip of lithium 0.1 inch (0.25 cm) wide remaining opposite the heat treated area of the separator and electrically connected to the nickel tab.

EXAMPLE II (PRIOR ART)

A cell is constructed as in Example I but without the microporous separator having been heat treated. When discharged at a constant rate of 400 milliamperes the cell achieves about 80% of theoretical capacity to a two-volt cutoff with thin fragmented sections of lithium remaining.

The foregoing examples are presented for the purpose of illustrating the invention and its advantages. It is understood that changes and variations can be made without departing from the scope of the present invention as defined in the following claims.

What is claimed is:

1. An electrochemical cell comprising a consumable electrode, a terminal for said electrode, said terminal and said consumable electrode being discrete elements, and an electrode of opposite polarity, said consumable electrode being connected to said terminal, said cell further comprising means to prevent electrical disengagement from said terminal of remote portions of said consumable electrode, wherein said means to prevent electrical disengagement retards reaction of a continuous portion of said consumable electrode from adjacent said terminal to a locus adjacent said remote portions, whereby said remote portions of said consumable electrode remain electrically connected to said terminal throughout discharge of said cell so that electrical continuity between said consumable electrode and said terminal is maintained.

2. The electrochemical cell of claim 1 wherein said portion extends along substantially the entire length of said consumable electrode.

3. An electrochemical cell comprising a consumable electrode, a terminal connection for said electrode, and an electrode of opposite polarity, wherein said consumable electrode is electrically engaged with said terminal connection, and further comprising means for retarding reaction of a portion of said consumable electrode, said portion being electrically connected throughout discharge of said cell to said terminal connection whereby electrical continuity between said consumable electrode and said terminal connection is maintained, wherein said means for retarding reaction comprises electrical insulation between a section of said electrode of opposite polarity, and the current collector thereof.

4. The electrochemical cell of claim 1 wherein said means to prevent electrical disengagement comprises a section of said electrode of opposite polarity having reduced ionic flow therein.

5. An electrochemical cell comprising a consumable electrode, a terminal connection for said electrode, and an electrode of opposite polarity, wherein said consumable electrode is electrically engaged with said terminal connection, and further comprising means for retarding reaction of a portion of said consumable electrode, said portion being electrically connected throughout discharge of said cell to said terminal connection whereby electrical continuity between said consumable electrode and said terminal connection is maintained, wherein said means for retarding reaction comprises a section of said electrode of opposite polarity having reduced electronic conductivity.

6. The electrochemical cell of claim 1 wherein said means to prevent electrical disengagement comprises a section of said electrode of opposite polarity having reduced cell reaction sites.

7. The electrochemical cell of claim 1 wherein said means to prevent electrical disengagement comprises an ionic flow impeding barrier positioned between the opposing surfaces of said consumable electrode and said electrode of opposite polarity.

8. The electrochemical cell of claim 7 wherein said barrier comprises at least one ionically less permeable portion of a separator disposed between said consumable electrode and said electrode of opposite polarity.

9. An electrochemical cell comprising a consumable electrode, a terminal connection for said electrode, and an electrode of opposite polarity, wherein said consumable electrode is electrically engaged with said terminal connection, and further comprising means for retarding reaction of a portion of said consumable electrode, said portion being electrically connected throughout discharge of said cell to said terminal connection whereby electrical continuity between said consumable electrode and said terminal connection is maintained, wherein said means for retarding reaction comprises an ionic flow barrier disposed within said consumable electrode.

10. The electrochemical cell of claim 1 wherein said consumable electrode is the limiting electrode of said cell.

11. The electrochemical cell of claim 10 wherein said limiting electrode is comprised of lithium.

12. The electrochemical cell of claim 11 wherein said cell contains a sulfur dioxide depolarizer.

13. The electrochemical cell of claim 1 wherein said portion occupies a volume of less than 20% of the consumable electrode.

14. An electrochemical cell comprising an elongated consumable metal anode, a terminal for said anode connected thereto at an end thereof, an elongated cathode and at least one elongated separator between said anode and cathode characterized in that means to prevent electrical disengagement from said terminal of remote portions of said elongated anode is positioned between opposing surfaces of said anode and cathode along substantially the entire length of the longitudinal axis of said anode and cathode and wherein said means comprises an ionic flow impeding barrier with a section thereof adjacent the end of said anode connected to said terminal.

15. The electrochemical cell of claim 14 wherein said anode is comprised of lithium.

16. The electrochemical cell of claim 15 wherein said ionic flow impeding barrier comprises at least one ionically less permeable portion of at least one of said separators.

17. The electrochemical cell of claim 16 wherein said less permeable portion is situated centrally along said longitudinal axis.

18. The electrochemical cell of claim 17 wherein said cathode comprises a carbonaceous substrate for a sulfur dioxide depolarizer.

19. The electrochemical cell of claim 18 wherein said anode, cathode and separators therebetween are wound into a rolled structure.

20. The electrochemical cell of claim 8 wherein said separator is comprised of polypropylene.

21. The electrochemical of claim 8 wherein said ionically less permeable portion of said separator comprises a densified portion of said separator.

22. The electrochemical cell of claim 21 with said separator having been heat treated to form said densified portion thereof.

23. The electrochemical cell of claim 16 wherein said ionically less permeable portion of at least one of said separators comprises a densified portion of at least one of said separators.

24. The electrochemical cell of claim 23 with said at least one of said separators having been heat treated to form said densified portion thereof.

25. The electrochemical cell of claim 18 wherein said separator is comprised of polypropylene.

* * * * *